United States Patent
Zhang et al.

(10) Patent No.: US 10,586,563 B1
(45) Date of Patent: Mar. 10, 2020

(54) HIGH PASSIVE STIFFNESS AND LOW ACTIVE PRESSURE AIR BEARING FEATURE

(71) Applicant: Seagate Technology LLC, Cupertino, CA (US)

(72) Inventors: HaiFeng Zhang, Normandale, MN (US); Abhik Rakshit, Normandale, MN (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 16/361,650

(22) Filed: Mar. 22, 2019

Related U.S. Application Data (60) Provisional application No. 62/647,128, filed on Mar. 23, 2018.

(51) Int. Cl.
*G11B 5/48* (2006.01)
*G11B 5/60* (2006.01)

(52) U.S. Cl.
CPC .......... *G11B 5/4826* (2013.01); *G11B 5/6064* (2013.01); *G11B 5/6082* (2013.01)

(58) Field of Classification Search
CPC .... G11B 5/4826; G11B 5/6082; G11B 5/6064
See application file for complete search history.

(56) References Cited

U.S. PATENT DOCUMENTS

| | | | |
|---|---|---|---|
| 5,343,343 A | 8/1994 | Chapin | |
| 5,751,517 A | 5/1998 | Agarwal | |
| 6,057,983 A * | 5/2000 | Kajitani | G11B 5/6005 360/235.6 |
| 6,144,528 A * | 11/2000 | Anaya-Dufresne | G11B 5/6005 360/235.4 |
| 6,188,547 B1 | 2/2001 | Gui et al. | |
| 6,490,135 B1 * | 12/2002 | Sannino | G11B 5/60 360/235.8 |
| 6,515,831 B1 * | 2/2003 | Sannino | G11B 5/6005 360/235.6 |
| 6,525,909 B1 * | 2/2003 | Qian | G11B 5/6005 360/235.7 |
| 6,594,113 B2 | 7/2003 | Rao et al. | |
| 6,661,612 B1 * | 12/2003 | Peng | G11B 5/6005 360/235.8 |
| 6,700,727 B1 * | 3/2004 | Crane | G11B 5/58 360/236.1 |

(Continued)

OTHER PUBLICATIONS

Song et al., "Contact Between a Thermal Flying Height Control Slider", Microsystem Technologies, vol. 18, Issue 9-10, pp. 1549-1557, Jun. 22, 2012, (9 pages).

(Continued)

*Primary Examiner* — Brian E Miller
(74) *Attorney, Agent, or Firm* — Kagan Binder, PLLC (57) ABSTRACT

Active pressure in the air bearing surface of a slider in the region of the transducer is reduced by introducing two channels in the center pad of the advanced air bearing along each side of the centerline and spaced apart from the transducer. This configuration moves the high pressure region away from the transducer zone at the trailing edge of the slider.

17 Claims, 6 Drawing Sheets

(2 of 6 Drawing Sheet(s) Filed in Color)

(56) References Cited

U.S. PATENT DOCUMENTS

| | | | |
|---|---|---|---|
| 7,154,709 B2 * | 12/2006 | Rao | G11B 5/6005 360/235.8 |
| 7,230,797 B1 * | 6/2007 | Liu | G11B 5/6005 360/235.8 |
| 7,855,854 B2 * | 12/2010 | Hu | G11B 5/6005 360/235.7 |
| 7,898,769 B2 | 3/2011 | Bolasna et al. | |
| 8,184,405 B1 | 5/2012 | Zheng et al. | |
| 8,199,437 B1 * | 6/2012 | Sun | G11B 5/6082 360/235.6 |
| 8,279,556 B2 | 10/2012 | Ruiz | |
| 8,320,082 B2 * | 11/2012 | Hanyu | G11B 5/6082 360/235.6 |
| 8,867,172 B2 * | 10/2014 | Zheng | G11B 5/607 360/235.7 |
| 2002/0063995 A1 * | 5/2002 | Sannino | G11B 5/6005 360/236.3 |
| 2002/0071216 A1 * | 6/2002 | Sannino | G11B 5/6005 360/236.1 |
| 2002/0109941 A1 * | 8/2002 | Chapin | G11B 5/60 360/235.7 |
| 2003/0053253 A1 * | 3/2003 | Mundt | G11B 5/6005 360/236.3 |
| 2003/0058578 A1 * | 3/2003 | Boutaghou | G11B 5/6005 360/235.8 |
| 2003/0165031 A1 * | 9/2003 | Rajakumar | G11B 5/6005 360/235.6 |
| 2004/0090709 A1 * | 5/2004 | Mundt | G11B 5/6005 360/236.3 |
| 2006/0114611 A1 * | 6/2006 | Zhu | G11B 5/6005 360/235.7 |

OTHER PUBLICATIONS

Gonzaga, et al., "Slider Design Optimization for Lube-Surfing Head-Disk Interface Scheme," IEEE Transactions on Magnetics, vol. 46, No. 6, pp. 1922-1924, Jun. 2010.

\* cited by examiner

HIGH PASSIVE STIFFNESS AND LOW ACTIVE PRESSURE AIR BEARING FEATURE

BACKGROUND

Examples of data storage components include components of hard disk drive systems (HDDs). HDDs include one or more magnetic data storage disks. HDDs are data storage devices that include one or more rotatable disks to which data is written and read by way of one or more transducing heads. A transducing head carried by a slider assembly near the disk is used to read from or write to data tracks on the magnetic disk while the disk spins. The slider assembly includes a transducing read head, a transducing write head, or both, along with a "slider element" that includes a surface that faces the spinning disk and acts as an "air bearing" relative to the spinning disk to permit smaller fly heights and close slider proximity to the disk surfaces.

Air bearing sliders have been extensively used in disc drives to appropriately position a transducing head above a rotating disc. In most high capacity storage applications, when the disc is at rest, the air bearing slider is in contact with the disc. During operation, the disc rotates at high speeds, which generates a wind of air immediately adjacent the flat surface of the disc. The wind acts upon the lower air bearing surface of the slider and generates a lift force directing the slider away from the disc and against a load beam causing the slider to fly at an ultra-low fly height above the disc. A slider is typically mounted on a gimbal and load beam assembly which biases the slider toward the rotating disc, providing a preload force opposite to the lift force acting on the air bearing surface of the slider. For the slider to maintain the ultra-low flying height above the surface of the disc, the lift force must be balanced with (and greater than) the preload forces.

The present disclosure relates to a slider having a configuration for reduction of active pressure in the advanced air bearing feature.

SUMMARY

Passive stiffness and active pressure are generally highly correlated in advanced air bearing ("AAB") designs, so that an AAB design having a high passive stiffness will also exhibit high active pressure. AAB designs having both high passive stiffness and also high active pressure leads to high PTC power and low contact detect capability.

Reduction of active pressure in the AAB at the transducer is achieved out by introducing two channels in the center pad of the AAB along each side of the centerline and spaced apart from the transducer. This configuration moves the high pressure region away from the transducer zone at the trailing edge of the slider.

In an embodiment, a slider comprises an air bearing surface side having a leading edge, a trailing edge, and a central longitudinal axis. A center pad region is provided on the air bearing surface side that is positioned proximate to the trailing edge, the center pad region comprising a center pad located proximate to the central longitudinal axis, and a recessed center pad portion defined by opposed first and second center pad rails that are generally parallel to the central longitudinal axis. A centrally positioned down-track channel defined by opposed first and second down-track rails that are generally parallel to the central longitudinal axis. The first down-track channel extends between the trailing edge and the leading edge and joins the first center pad rail, and the second down-track channel extends between the trailing edge and the leading edge and joins the second center pad rail. An embedded transducer is provided proximate to the intersection of the central longitudinal axis and the trailing edge. The center pad region comprises a first center pad channel between the center pad and the first center pad rail and a second center pad channel between the center pad and the second center pad rail. The first center pad channel and the second first center pad channel each provide longitudinal fluid passage from the recessed center pad portion through the trailing edge of the slider. The first center pad channel and the second center pad channel are located on either side of the embedded transducer and are independently spaced apart from the embedded transducer a distance of from about 5 microns to 20 microns. The first center pad channel and the second center pad channel each independently have a width of from about 5 to about 40 microns and a depth relative to the center pad of from about 0.05 to about 0.5 microns.

The present configuration provides a slider air bearing surface design that exhibits high passive stiffness and low active pressure. The present slider therefore provides excellent contact detect capability and exhibits low PTC power, low pitch torque sensitivity to fly height and low z-height sensitivity.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION

Figure 1:
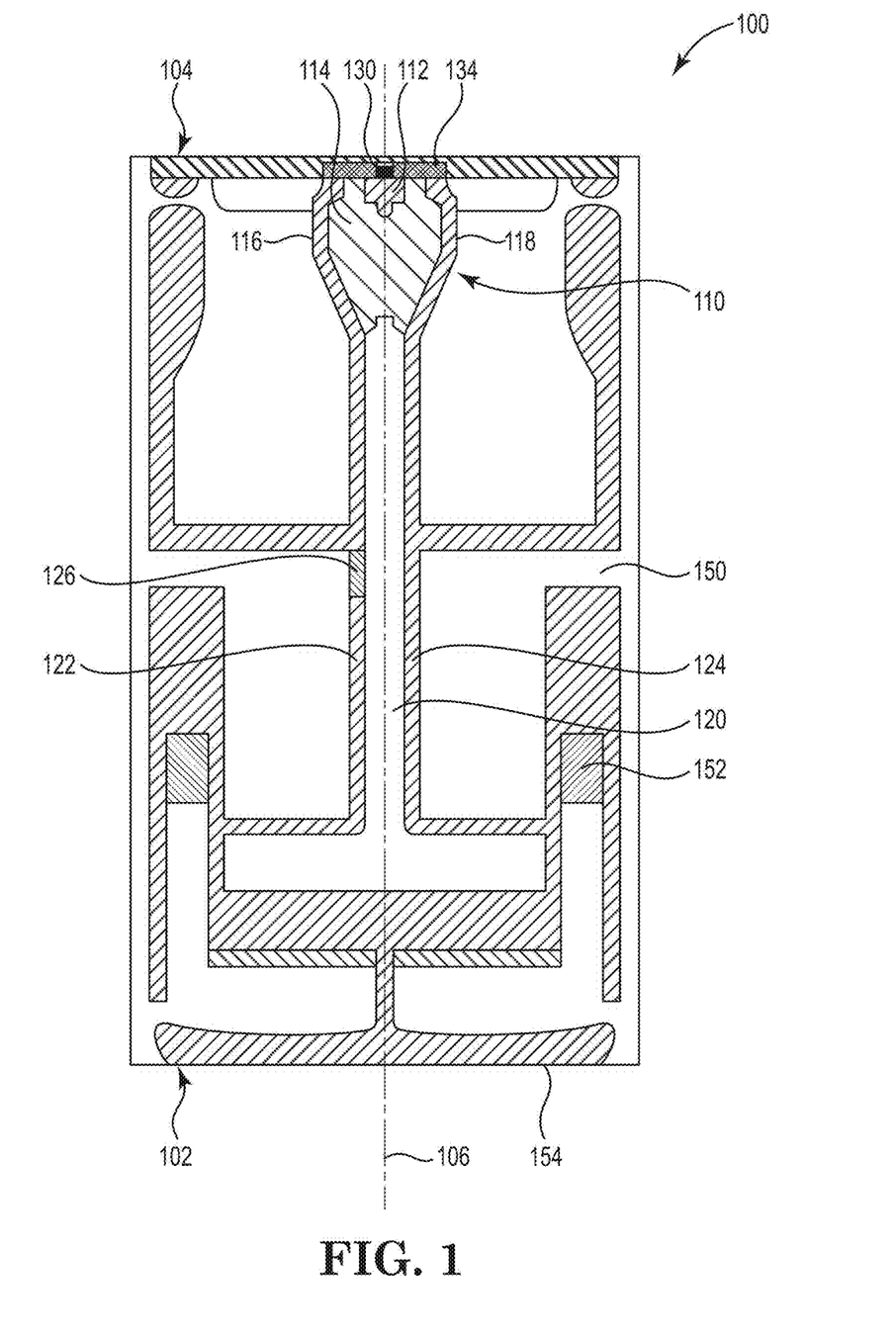
FIG. 1 is a schematic underside view of an embodiment of a slider air bearing surface of the present invention. The illustration is shaded to distinguish depths of various topographical features.
Figure 2:
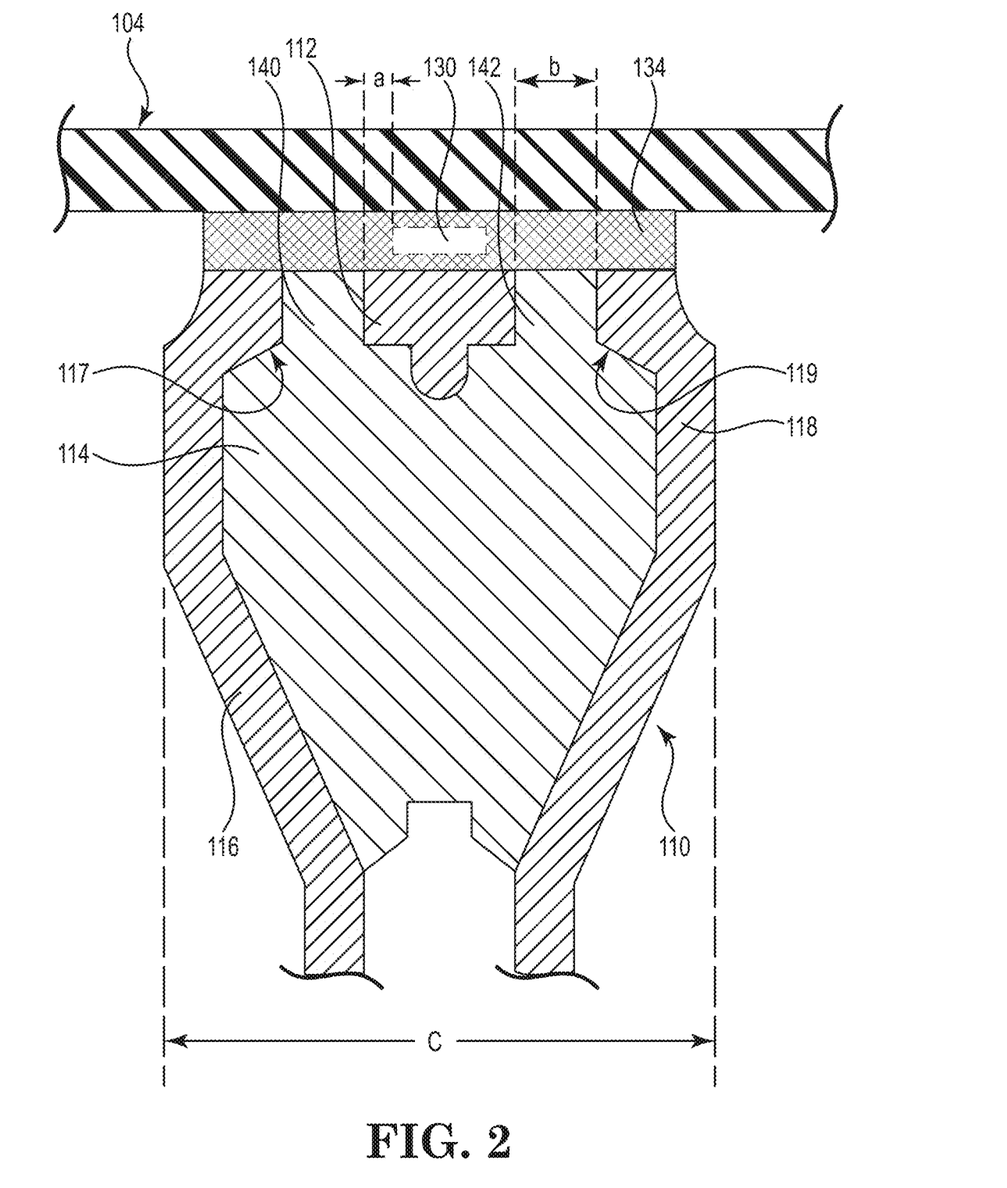
FIG. 2 is a schematic underside view of a portion of an embodiment of a slider air bearing surface as shown in FIG. 1. The illustration is shaded to distinguish depths of various topographical features.

An embodiment of the present slider is illustrated in FIGS. 1, and 2, which are schematic underside views of an air bearing surface side of the slider, with shading to distinguish depths of various topographical features. Slider 100 comprises a leading edge 102, a trailing edge 104, and a central longitudinal axis 106. Center pad region 110 comprises a center pad 112 located proximate to central longitudinal axis 106, and a recessed center pad portion 114 defined by opposed first center pad rail 116 and second center pad rail 118, which rails are generally parallel to the central longitudinal axis 106. As shown, one or both of first center pad rail 116 and second center pad rail 118 may comprise portions thereof that are angled from parallel to the central longitudinal axis 106, which may provide advantageous fluid flow dynamics during operation of the slider. Likewise, one or both of first center pad rail 116 and second center pad rail 118 may comprise shoulder portions 117 and 119 that direct fluid flow in a direction that is not parallel to the central longitudinal axis. This redirection of fluid flow may provide advantageous fluid flow dynamics during operation of the slider. Center pad region 110 is shown in more detail in FIG. 2, wherein like parts are identified by the same reference numerals.

The topographical features of the air bearing surface side of slider 100 are characterized by a depth relative to a topmost AAB surface, and additionally by the depth of any given feature relative to another feature. For purposes of discussion of the embodiment shown in FIGS. 1 and 2, first center pad rail 116 and second center pad rail 118 are at the depth corresponding to the topmost AAB surface. Likewise, center pad 112 in the present embodiment is at the depth corresponding to the topmost AAB surface. In other embodiments, another feature on the air bearing surface side of the slider may be at the depth corresponding to the topmost AAB surface, with the depths of the various features described herein defined relative to each other. Recessed center pad portion 114 is at a depth that is lower than center pad 112, first center pad rail 116 and second center pad rail 118. In an embodiment, recessed center pad portion 114 is at a depth that is from 0.05 to 0.5 microns lower than center pad 112. In an embodiment, recessed center pad portion 114 is at a depth that is from 0.1 to 0.3 microns lower than center pad 112. In an embodiment, center pad 112, first center pad rail 116 and second center pad rail 118 are a depths that are different from each other, but all of which being at depths that are higher than that of recessed center pad portion 114.

Slider 100 further comprises centrally positioned downtrack channel 120 defined by opposed first down-track rail 122 and second down-track rail 124 that are generally parallel to central longitudinal axis 106. In an embodiment, centrally positioned down-track channel 120 is at a depth that is from 3 to 6 microns lower than center pad 112. In an embodiment, centrally positioned down-track channel 120 is at a depth that is from 4 to 5 microns lower than center pad 112. First down-track rail 122 extends between trailing edge 104 and leading edge 102 and joins first center pad rail 116. Second down-track rail 124 extends between trailing edge 104 and leading edge 102 and joins second center pad rail 118. The first down-track rail 122 and the second down-track rail 124 can each independently be approximately between 50% and 70% of the length of the slider. Either or both of the first down-track rail 122 and the second down-track rail 124 may optionally be interrupted by a recessed portion 126 that is at a depth that is lower than the respective rail. In an embodiment, one of the first down-track rail 122 and the second down-track rail 124 is at a depth that is lower than the other of the first down-track rail 122 and the second down-track rail 124 for some or all of the length of the rails. In an embodiment, one or both of the first down-track rail 122 and the second down-track rail 124 is interrupted to provide one or more cross-track channels that are substantially perpendicular to central longitudinal axis 106.

In an embodiment, the height of features on the air bearing surface side of slider 100 may vary within the feature, or the features may have top surfaces that taper in the direction of trailing edge 104 or leading edge 102 and/or in the direction of one side or other of the slider.

Transducer 130 is embedded proximate to the intersection of central longitudinal axis 106 and trailing edge 104. In an embodiment transducer 130 is embedded in a trailing edge region 134 that is located between trailing edge 104 and center pad 112. In an embodiment, trailing edge region 134 is at a depth that is the same as that of recessed center pad portion 114. In an embodiment, trailing edge region 134 is at a depth that is lower than that of recessed center pad portion 114.

Center pad region 110 additionally comprises a first center pad channel 140 between center pad 112 and first center pad rail 116, and a second center pad channel 142 between center pad 112 and second center pad rail 118. The first center pad channel 140 and the second center pad channel 144 each provide longitudinal fluid passage from the recessed center pad portion 114 through the trailing edge 104 of slider 100. First center pad channel 140 and second center pad channel 142 are located on either side of embedded transducer 130 and each is independently spaced from embedded transducer 130 a distance "a" of from about 5 microns to 20 microns. In an embodiment, first center pad channel 140 and second center pad channel 142 are independently spaced from embedded transducer 130 a distance "a" of from about 5 microns to 10 microns. In an embodiment, first center pad channel 140 and second center pad channel 142 are symmetrically spaced from embedded transducer 130.

In an embodiment, trailing edge region 134 is at a depth that is lower than that of first center pad channel 140 and second center pad channel 142. In an embodiment, trailing edge region 134 is at a depth that is from 0.001 to 0.006 microns lower than center pad 112. In an embodiment, trailing edge region 134 is at a depth that is from 0.002 to 0.004 microns lower than center pad 112. In an embodiment, first center pad channel 140 and second center pad channel 142 each independently have a width "b" of from about 5 to about 40 microns and a depth relative to center pad 112 of from about 0.05 to about 0.5 microns.

In an embodiment, first center pad channel 140 and second center pad channel 142 each independently have a width "b" of from about 10 to about 30 microns, or each independently have a width "b" of from about 15 to about 20 microns. In an embodiment, the width of first center pad channel 140 and second center pad channel 142 is the same.

In an embodiment, first center pad channel 140 and second center pad channel 142 each independently have a depth relative to center pad 112 of from about 0.1 to about 0.35 microns, or each independently have a depth relative to center pad 112 of from about 0.15 to about 0.3 microns. In an embodiment, the depth of first center pad channel 140 and second center pad channel 142 is the same.

In an embodiment, first center pad channel 140 and second center pad channel 142 each have the same depth as recessed center pad portion 114. In an embodiment, first center pad channel 140 and second center pad channel 142 each have a depth that is lower than recessed center pad portion 114. In an embodiment, first center pad channel 140 and second center pad channel 142 each have a depth that is higher than recessed center pad portion 114. In an embodiment, trailing edge region 134 is at a depth that is the same as that of first center pad channel 140 and second center pad channel 142. In an embodiment, trailing edge region 134 is at a depth that is lower than that of first center pad channel 140 and second center pad channel 142. In an embodiment, trailing edge region 134 is at a depth that is higher than that of first center pad channel 140 and second center pad channel 142.

In an embodiment, the center pad 110 has a transverse width "c" of from about 90 to 130 microns.

Slider 100 may additionally comprise topographical features such as channel 150, recess 152 and rail 154 as desired to modify flight characteristics of the slider, that are oriented in the same direction as the longitudinal axis, transverse to the longitudinal axis, or at an angle relative to the longitudinal axis. Such features may have straight geometries or curved geometries. In an embodiment, slider 100 comprises one or more cross-track (i.e. transversely oriented) channels having a transverse length that is between approximately 25% and 75% of the slider width. In an embodiment, cross-track features, such as channel 150, have a depth relative to center pad 112 of from about 3 to about 6 microns, or from about 4 to about 5 microns. In an embodiment, recess features such as recess 152 or features located on the side closer to leading edge 102 of any rails or elevated features have a depth relative to center pad 112 of from about 0.1 to about 1.3 microns.

In operation, slider 100 slides over the surface of a disc. At startup, the disc rotates about its axis which generates a wind of air immediately adjacent to the surface of the disc. The wind of air flows in relation to the air bearing surface side of slider 100 from leading edge 102 toward trailing edge 104. The flight characteristics of the slider are determined in general by air flow over the topographical features discussed above.

A portion of the air is directed into centrally positioned down-track channel 120, and passes on over recessed center pad portion 114. Confining the air within certain features on the slider generates a lift force, thereby pushing slider 100 upward and away from the disc. The lift force balances negative pressure generated by other topographical features and preload force from the assembly holding the slider, and enables slider 100 to maintain an ultra-low flying height above the disc.

Figure 3:
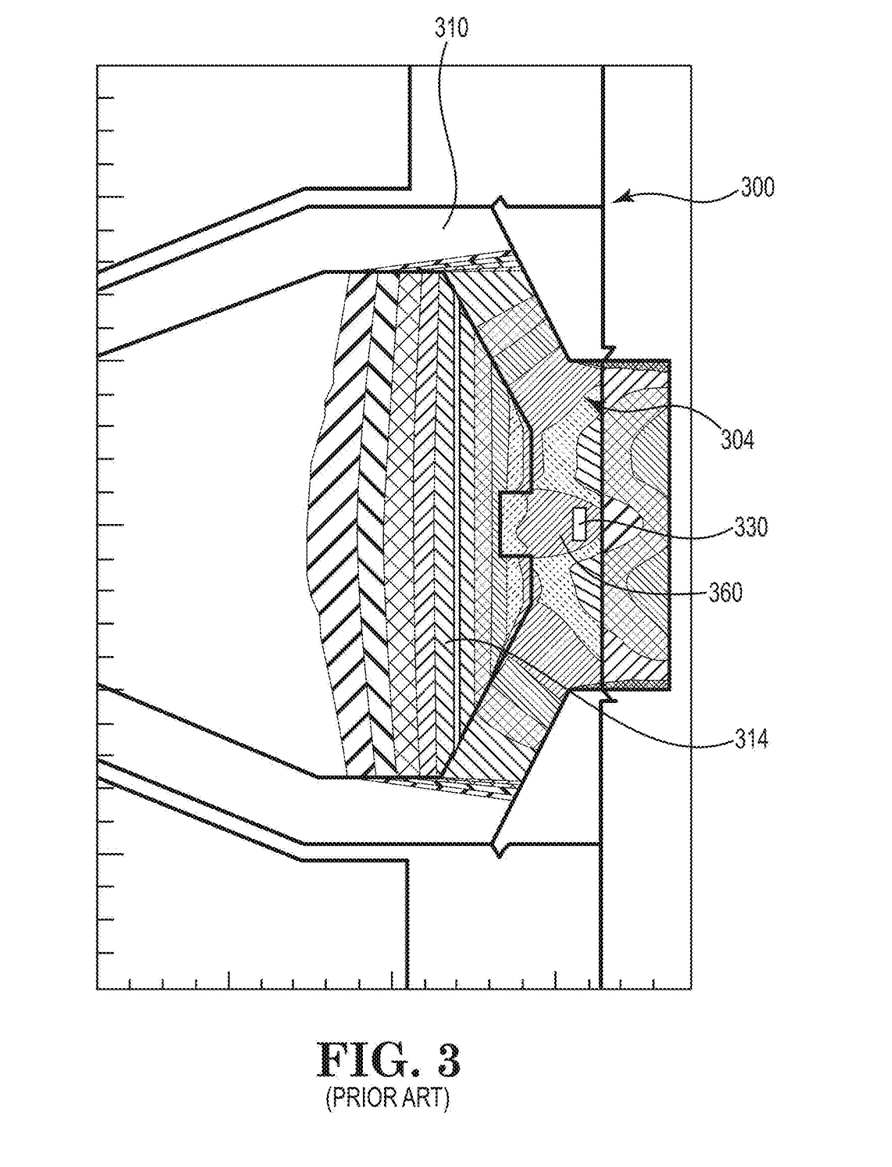
FIG. 3 is a schematic underside view of a portion of a prior art slider that is a pressure contour plot of the air bearing surface.

FIG. 3 is a schematic underside view of a portion of a prior art slider that is a pressure contour plot of the air bearing surface. Slider 300 comprises center pad rail 310 that forms a perimeter on three sides of recessed center pad portion 314. Embedded transducer 330 is located near trailing edge 304. The pressure contour plot shows various pressures by the contour lines in the figure. Because slider 300 does not contain first and second center pad channels, the active pressure at the transducer is relatively high, as indicated by the contour lines at that point on the pressure contour plot, which is in contrast with the lower pressure in locations upstream from this portion of slider 300.

Figure 4:
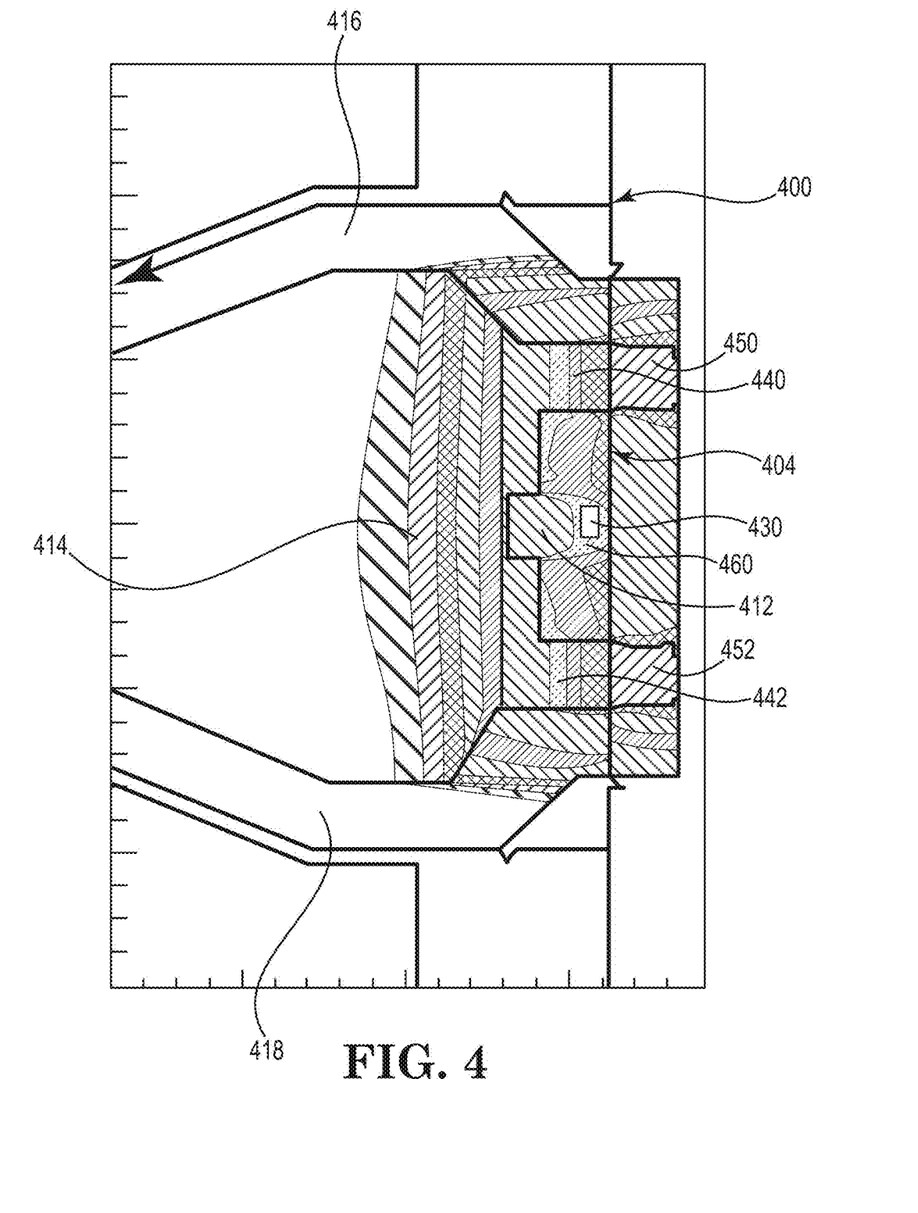
FIG. 4 is a schematic underside view of a portion of an embodiment of the present slider that is a pressure contour plot of the air bearing surface.

FIG. 4 is a schematic underside view of a portion of an embodiment of the present slider that is a pressure contour plot of the air bearing surface. Slider 400 comprises center pad 412 and center pad rails 416 and 418 that define recessed center pad portion 414. A first center pad channel 440 is located between center pad 412 and first center pad rail 416, and a second center pad channel 442 is located between center pad 412 and second center pad rail 418. Embedded transducer 430 is located near trailing edge 404. The pressure contour plot shows various pressures by the contour lines in the figure. Because slider 400 does contain first center pad channel 440 and second center pad channel 442, the active pressure downstream from these channels is relatively high, as indicated by the high pressure identified by the contour lines at regions 450 and 652 on the pressure contour plot. In contrast, the active pressure at the transducer is relatively low, as indicated by the contour lines at region 460 on the pressure contour plot.

Figure 5:
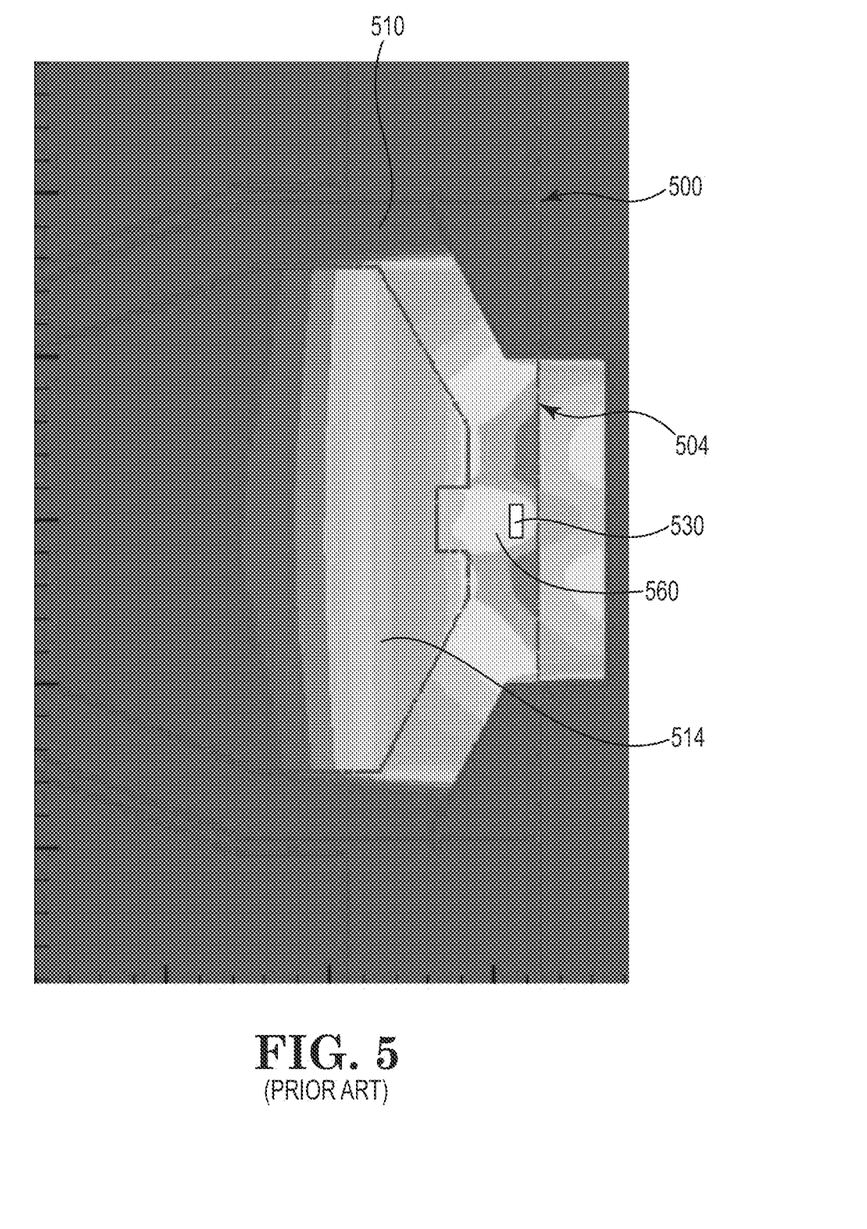
FIG. 5 is a schematic underside view of a portion of a prior art slider that is a pressure contour plot of the air bearing surface as in FIG. 3, except that this figure is in color.

FIG. 5 is a schematic underside view of a portion of a prior art slider that is a pressure contour plot of the air bearing surface in color, which corresponds to the view shown in FIG. 5 as a line drawing. Slider 500 comprises center pad rail 510 that forms a perimeter on three sides of recessed center pad portion 514, Embedded transducer 530 is located near trailing edge 504. The pressure contour plot shows various pressures by the colors blue, green, yellow and red in order of increasing pressure. Because slider 500 does not contain first and second center pad channels, the active pressure at the transducer is relatively high, as indicated by the yellow color at that point on the pressure contour plot, which is in contrast with the lower pressure in locations upstream from this portion of slider 500 indicated in green and blue.

Figure 6:
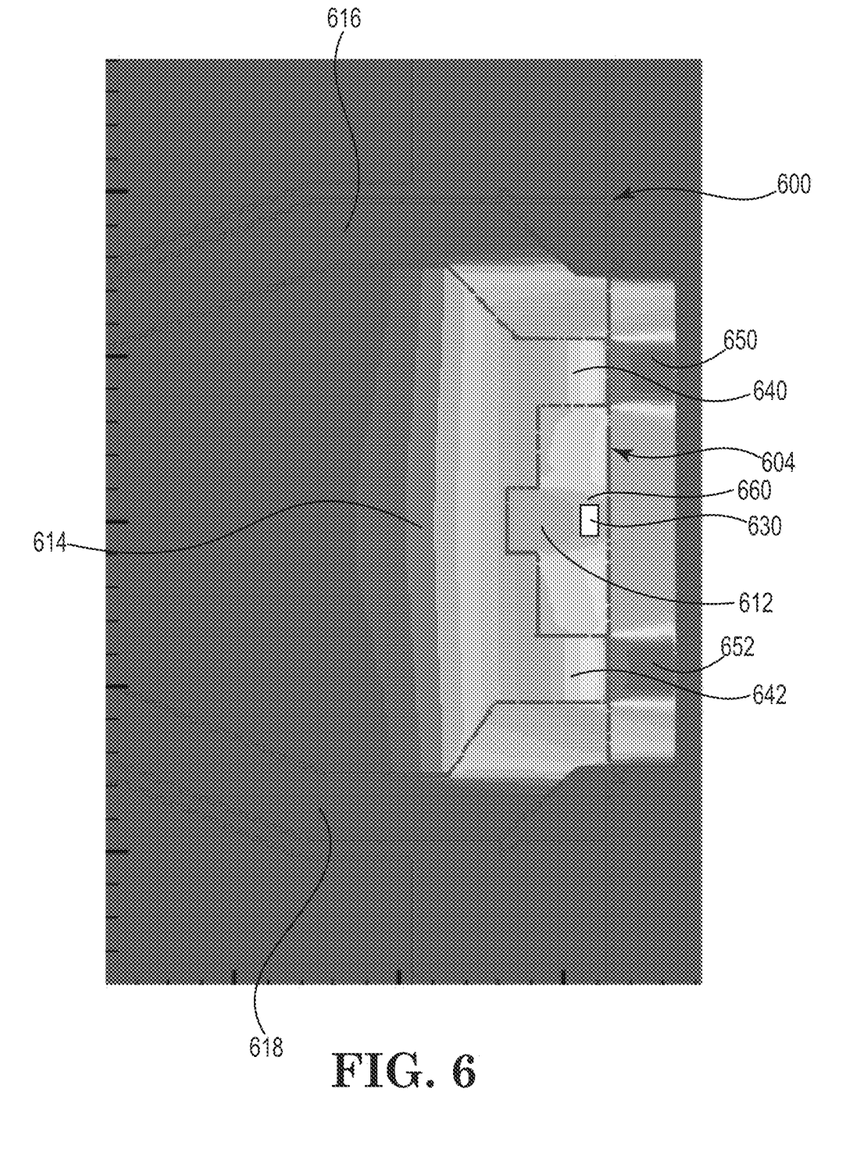
FIG. 6 is a schematic underside view of a portion of an embodiment of the present slider that is a pressure contour plot of the air bearing surface as in FIG. 4, except that this figure is in color.

FIG. 6 is a schematic underside view of a portion of an embodiment of the present slider that is a pressure contour plot of the air bearing surface in color, which corresponds to the view shown in FIG. 4 as a line drawing. Slider 600 comprises center pad 612 and center pad rails 616 and 618 that define recessed center pad portion 614. A first center pad channel 640 is located between center pad 612 and first center pad rail 616, and a second center pad channel 642 is located between center pad 612 and second center pad rail 618. Embedded transducer 630 is located near trailing edge 604. The pressure contour plot shows various pressures by the colors blue, green, yellow and red in order of increasing pressure. Because slider 600 does contain first center pad channel 640 and second center pad channel 642, the active pressure behind these channels is relatively high, as indicated by the red color at regions 650 and 652 on the pressure contour plot. In contrast, the active pressure at the transducer is relatively low, as indicated by the green color at region 660 on the pressure contour plot.

In an embodiment, the active pressure at the transducer is at least 15% lower than that of a like slide that does not contain the first center pad channel and the second center pad channel. In an embodiment, the active pressure at the transducer is at least 20% lower than that of a like slide that does not contain the first center pad channel and the second center pad channel. In an embodiment, the active pressure at the transducer is at least 25% lower than that of a like slide that does not contain the first center pad channel and the second center pad channel. In an embodiment, the active pressure at the transducer is at least 30% lower than that of a like slide that does not contain the first center pad channel and the second center pad channel.

What is claimed is:

1. A slider comprising:
   an air bearing surface side having a leading edge, a trailing edge, and a central longitudinal axis;
   a center pad region on the air bearing surface side positioned proximate to the trailing edge, the center pad region comprising a center pad located proximate to the central longitudinal axis, and a recessed center pad portion defined by opposed first and second center pad rails that are generally parallel to the central longitudinal axis;
   a centrally positioned down track channel defined by opposed first and second down-track rails that are generally parallel to the central longitudinal axis, the first down-track channel extending between the trailing edge and the leading edge and joining the first center pad rail, and the second down-track channel extending between the trailing edge and the leading edge and joining the second center pad rail; and an embedded transducer proximate to the intersection of the central longitudinal axis and the trailing edge;
wherein the center pad region comprises
a first center pad channel between the center pad and the first center pad rail and
a second center pad channel between the center pad and the second center pad rail, the first center pad channel and the second first center pad channel each providing longitudinal fluid passage from the recessed center pad portion through the trailing edge of the slider,
the first center pad channel and the second center pad channel being located on either side of the embedded transducer and independently spaced apart from the embedded transducer a distance of from about 5 microns to 20 microns, and
the first center pad channel and the second center pad channel each independently having a width of from about 5 to about 40 microns and a depth relative to the center pad of from about 0.05 to about 0.5 microns.

2. The slider of claim 1, wherein each of the first center pad channel and the second center pad channel has a width of from about 15 to about 20 microns and a depth relative to the center pad of from 0.1 to about 0.35 microns.

3. The slider of claim 1, wherein each of the first center pad channel and the second center pad channel has a width of from about 15 to about 20 microns and a depth relative to the center pad of from 0.15 to about 0.3 microns.

4. The slider of claim 1, wherein the channels at the trailing edge of the slider are located a distance of from about 5 microns to 10 microns of the transducer.

5. The slider of claim 1, wherein one or both of the first center pad rail and the second center pad rail comprises portions thereof that are angled from parallel to the central longitudinal axis.

6. The slider of claim 1, wherein one or both of the first center pad rail and the second center pad rail comprises shoulder portions that direct fluid flow in a direction that is not parallel to the central longitudinal axis.

7. The slider of claim 1, wherein the first center pad rail, the second center pad rail, and the center pad are all at a depth corresponding to a topmost Advanced Air Bearing surface of the slider.

8. The slider of claim 1, wherein the recessed center pad portion is depth that is from 0.05 to 0.5 microns lower than the center pad.

9. The slider of claim 1, wherein the recessed center pad portion is at a depth that is from 0.1 to 0.3 microns lower than the center pad.

10. The slider of claim 1, herein the first down-track rail and the second down-track rail are each independently between 50% and 70% of the length of the slider.

11. The slider of claim 1, wherein the embedded transducer is embedded in a trailing edge region that is located between the trailing edge and the center pad.

12. The slider of claim 1, wherein the trailing edge region is at a depth that is the same as that of the recessed center pad portion.

13. The slider of claim 1, wherein the center pad has a transverse width of from about 90 to 130 microns.

14. The slider of claim 1, wherein active pressure at the transducer is at least 15% lower than that of a like slider that does not contain the first center pad channel and the second center pad channel as defined in claim 1.

15. The slider of claim 1, wherein active pressure at the transducer is at least 20% lower than that of a like slider that does not contain the first center pad channel and the second center pad channel as defined in claim 1.

16. The slider of claim 1, wherein active pressure at the transducer is at least 25% lower than that of a like slider that does not contain the first center pad channel and the second center pad channel as defined in claim 1.

17. The slider of claim 1, wherein active pressure at the transducer is at least 30% lower than that of a like slider that does not co stain the first center pad channel and the second center pad channel as defined in claim 1.

\* \* \* \* \*

UNITED STATES PATENT AND TRADEMARK OFFICE
CERTIFICATE OF CORRECTION

| | |
|---|---|
| PATENT NO. | : 10,586,563 B1 |
| APPLICATION NO. | : 16/361650 |
| DATED | : March 10, 2020 |
| INVENTOR(S) | : HaiFeng Zhang and Abhik Rakshit |

It is certified that error appears in the above-identified patent and that said Letters Patent is hereby corrected as shown below:

In the Claims

Column 8, Claim 10, Line 11, "The slider of claim 1, herein the first down-track rail" should be – The slider of claim 1, wherein the first down-track rail –

Column 8, Claim 17, Line 37, "does not co stain the first center pad channel and the second" should be – does not contain the first center pad channel and the second –

Signed and Sealed this
Thirty-first Day of May, 2022

Katherine Kelly Vidal
*Director of the United States Patent and Trademark Office*